(12) United States Patent
Tomizawa et al.

(10) Patent No.: US 11,075,368 B2
(45) Date of Patent: Jul. 27, 2021

(54) ALL SOLID BATTERY AND MANUFACTURING METHOD OF THE SAME

(71) Applicant: TAIYO YUDEN CO., LTD., Tokyo (JP)

(72) Inventors: Sachie Tomizawa, Takasaki (JP); Daigo Ito, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 170 days.

(21) Appl. No.: 16/177,778

(22) Filed: Nov. 1, 2018

(65) Prior Publication Data

US 2019/0131616 A1    May 2, 2019

(30) Foreign Application Priority Data

Nov. 2, 2017 (JP) .............................. JP2017-213072

(51) Int. Cl.
| | |
|---|---|
| *H01M 4/133* | (2010.01) |
| *H01M 10/0525* | (2010.01) |
| *H01M 4/1393* | (2010.01) |
| *H01M 4/04* | (2006.01) |
| *H01M 4/1397* | (2010.01) |
| *H01M 10/0562* | (2010.01) |
| *H01M 4/136* | (2010.01) |
| *H01M 4/62* | (2006.01) |
| *H01M 4/36* | (2006.01) |
| *H01M 10/0585* | (2010.01) |
| *H01M 4/58* | (2010.01) |

(52) U.S. Cl.
CPC ......... *H01M 4/133* (2013.01); *H01M 4/0407* (2013.01); *H01M 4/0471* (2013.01); *H01M 4/136* (2013.01); *H01M 4/1393* (2013.01); *H01M 4/1397* (2013.01); *H01M 4/364* (2013.01); *H01M 4/625* (2013.01); *H01M 10/0525* (2013.01); *H01M 10/0562* (2013.01); *H01M 10/0585* (2013.01); *H01M 4/5825* (2013.01); *H01M 2300/0071* (2013.01)

(58) Field of Classification Search
CPC ..... H01M 10/0525; H01M 2300/0071; H01M 4/0471; H01M 4/133; H01M 4/1393
See application file for complete search history.

(56) References Cited

U.S. PATENT DOCUMENTS

| | | | | |
|---|---|---|---|---|
| 2009/0176147 | A1* | 7/2009 | Hatanaka | ................. H01M 4/62 |
| | | | | 429/94 |
| 2015/0295224 | A1* | 10/2015 | Onodera | ............. H01M 4/1391 |
| | | | | 156/52 |
| 2018/0241076 | A1* | 8/2018 | Nishiura | ............... H01M 4/133 |

FOREIGN PATENT DOCUMENTS

| | | | |
|---|---|---|---|
| JP | 2001185148 | A | 7/2001 |
| JP | 2015195180 | A | 11/2015 |
| JP | 2016009679 | A | 1/2016 |

(Continued)

*Primary Examiner* — Adam A Arciero
(74) *Attorney, Agent, or Firm* — Law Office of Katsuhiro Arai (57) ABSTRACT

An all solid battery includes: a solid electrolyte layer including an oxide-based electrolyte; a first electrode layer that is formed on a first face of the solid electrolyte layer and includes a ceramic grain; and a second electrode layer that is formed on a second face of the solid electrolyte layer and includes a ceramic grain, wherein at least one of the first electrode layer and the second electrode layer includes a micro particle carbon and a board-shaped carbon.

6 Claims, 4 Drawing Sheets

(56) References Cited

FOREIGN PATENT DOCUMENTS

WO 2013038948 A1 3/2013
WO WO-2017022734 A1 * 2/2017 ............ H01M 4/621

* cited by examiner

ALL SOLID BATTERY AND MANUFACTURING METHOD OF THE SAME

CROSS-REFERENCE TO RELATED APPLICATION

This application is based upon and claims the benefit of priority of the prior Japanese Patent Application No. 2017-213072, filed on Nov. 2, 2017, the entire contents of which are incorporated herein by reference.

FIELD

A certain aspect of the present invention relates to an all solid battery and a manufacturing method of an all solid battery.

BACKGROUND

Recently, secondary batteries are being used in various fields. Secondary batteries having electrolytic liquid have a problem such as leak of the electrolytic liquid. And so, all solid batteries having a solid electrolyte and other solid elements are being developed. International Publication No. WO2013/038948 discloses a technology in which carbon powders are added to an electrode layer in order to achieve electron conductivity.

SUMMARY OF THE INVENTION

However, in oxide-based solid electrolyte formed by sintering, sintering property of the oxide-based electrolyte may be degraded and ionic conductivity may be degraded, when the carbon powders exist in the oxide-based solid electrolyte.

The present invention has a purpose of providing an all solid battery and a manufacturing method of an all solid battery that are capable of achieving preferable electron conductivity and preferable ionic conductivity.

According to an aspect of the present invention, there is provided an all solid battery including: a solid electrolyte layer including an oxide-based electrolyte; a first electrode layer that is formed on a first face of the solid electrolyte layer and includes a ceramic grain; and a second electrode layer that is formed on a second face of the solid electrolyte layer and includes a ceramic grain, wherein at least one of the first electrode layer and the second electrode layer includes a micro particle carbon and a board-shaped carbon.

According to another aspect of the present invention, there is provided a manufacturing method of an all solid battery including: a first step of arranging a paste for an electrode layer on both faces of a green sheet including a particle of an oxide-based solid electrolyte, the paste including a micro particle carbon, a board-shaped carbon and a ceramic particle; and a second step of firing a structure formed in the first step.

DETAILED DESCRIPTION

A description will be given of an embodiment with reference to the accompanying drawings.

Embodiment

Figure 1:
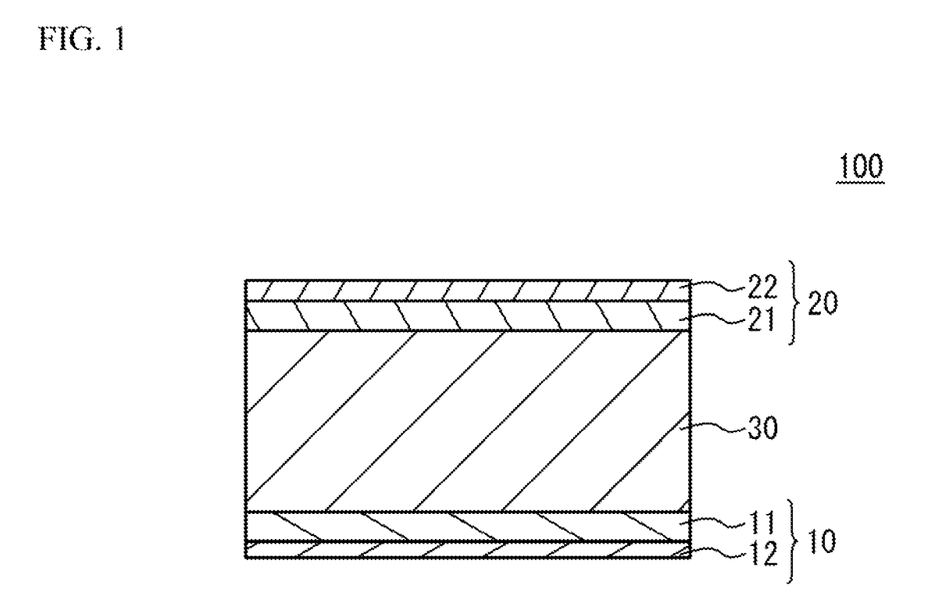
FIG. 1 illustrates a schematic cross section of an all solid battery in accordance with an embodiment.

FIG. 1 illustrates a schematic cross section of an all solid battery 100 in accordance with an embodiment. As illustrated in FIG. 1, the all solid battery 100 has a structure in which a first electrode 10 and a second electrode 20 sandwich an oxide-based solid electrolyte layer 30. The first electrode 10 has a structure in which a first electrode layer 11 and an electric collector layer 12 are stacked. The first electrode layer 11 is on the solid electrolyte layer 30 side. The second electrode 20 has a structure in which a second electrode layer 21 and an electric collector layer 22 are stacked. The second electrode layer 21 is on the solid electrolyte layer 30 side. Therefore, the first electrode layer 11 is formed on a first face of the solid electrolyte layer 30, and the second electrode layer 21 is formed on a second face of the solid electrolyte layer 30. Each thickness is not limited. However, when a thickness of the electrode layers is excessively small, it is not easy to enlarge a capacity density. When the thickness of the electrode layers is excessively large, a responsibility (output characteristic) of the all solid battery 100 may be degraded. And so, it is preferable that a thickness of the first electrode layer 11 and the second electrode layer 21 is 1 μm to 100 μm. It is more preferable that the thickness is 2 μm to 50 μm. When the solid electrolyte layer 30 is excessively thin, a short may occur. When the solid electrolyte layer 30 is excessively thick, the output characteristic may be degraded and the capacity density may be reduced. And so, it is preferable that a thickness of the solid electrolyte layer 30 is 0.5 μm to 30 μm. It is more preferable that the thickness is 1 μm to 15 μm.

When the all solid battery 100 is used as a secondary battery, one of the first electrode 10 and the second electrode 20 is used as a positive electrode and the other is used as a negative electrode. In the embodiment, as an example, the first electrode 10 is used as a positive electrode, and the second electrode 20 is used as a negative electrode.

At least, the solid electrolyte layer 30 is an oxide-based solid electrolyte. For example, the solid electrolyte layer 30 has a NASICON structure. An oxide-based solid electrolyte having the NASICON structure has a high conductivity and is stable in normal atmosphere. The oxide-based solid electrolyte having the NASICON structure is, for example, such as a salt of phosphoric acid including lithium. The salt of phosphoric acid is not limited. For example, the salt of phosphoric acid is such as composite salt of phosphoric acid with Ti (for example $Li_{1+x}Al_xTi_{2-x}(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the salt of phosphoric acid including lithium and having the NASICON structure is Li—Al—Ge—$PO_4$-based material (for example, $Li_{1+x}Al_xGe_{2-x}(PO_4)_3$), $Li_{1+x}Al_xZr_{2-x}(PO_4)_3$, $Li_{1+x}Al_xTi_{2-x}(PO_4)_3$ or the like. For example, it is preferable that Li—Al—Ge—$PO_4$-based material, to which a transition metal included in the salt of phosphoric acid having the olivine type crystal structure included in the first electrode layer 11 and the second electrode layer 21 is added in advance, is used. For example, when the first electrode layer 11 and the second electrode layer 21 include a salt of phosphoric acid including Co and Li, it is preferable that the solid electrolyte layer 30 includes Li—Al—Ge—PO$_4$-based material to which Co is added in advance. In this case, it is possible to suppress solving of the transition metal included in the electrode active material into the electrolyte.

At least, the first electrode layer 11 used as a positive electrode includes a material having an olivine type crystal structure, as an electrode active material. It is preferable that the second electrode layer 21 also includes the electrode active material. The electrode active material is such as a salt of phosphoric acid including a transition metal and lithium. The olivine type crystal structure is a crystal of natural olivine. It is possible to identify the olivine type crystal structure, by using X-ray diffraction.

For example, LiCoPO$_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or PO$_4$ may fluctuate in accordance with a valence. It is preferable that Co, Mn, Fe, Ni or the like is used as the transition metal.

The electrode active material having the olivine type crystal structure acts as a positive electrode active material in the first electrode layer 11 acting as a positive electrode. For example, when only the first electrode layer 11 includes the electrode active material having the olivine type crystal structure, the electrode active material acts as the positive electrode active material. When the second electrode layer 21 also includes an electrode active material having the olivine type crystal structure, discharge capacity may increase and an operation voltage may increase because of electric discharge, in the second electrode layer 21 acting as a negative electrode. The function mechanism is not completely clear. However, the mechanism may be caused by partial solid-phase formation together with the negative electrode active material.

When both the first electrode layer 11 and the second electrode layer 21 include an electrode active material having the olivine type crystal structure, the electrode active material of each of the first electrode layer 11 and the second electrode layer 21 may have a common transition metal. Alternatively, the a transition metal of the electrode active material of the first electrode layer 11 may be different from that of the second electrode layer 21. The first electrode layer 11 and the second electrode layer 21 may have only single type of transition metal. The first electrode layer 11 and the second electrode layer 21 may have two or more types of transition metal. It is preferable that the first electrode layer 11 and the second electrode layer 21 have a common transition metal. It is more preferable that the electrode active materials of the both electrode layers have the same chemical composition. When the first electrode layer 11 and the second electrode layer 21 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second electrode layer 21 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second electrode layer 21. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid, a carbon, a vanadium lithium phosphate.

In the forming process of the first electrode layer 11 and the second electrode layer 21, moreover, oxide-based solid electrolyte material or a conductive material (conductive auxiliary agent) such as a carbon or a metal may be added. When the material is evenly dispersed into water or organic solution together with binder or plasticizer, a paste for electrode layer is obtained. Pd, Ni, Cu, or Fe, or an alloy thereof may be used as a metal of the conductive auxiliary agent.

A conductive material such as a carbon or a metal may be used as the electric collector layers 12 and 22. A simple metal substance such as Ni, Cu, Pd, Ag, Pt, Au, Al or Fe, or an alloy thereof, or an oxide thereof may be used as the conductive material.

Figure 2A:
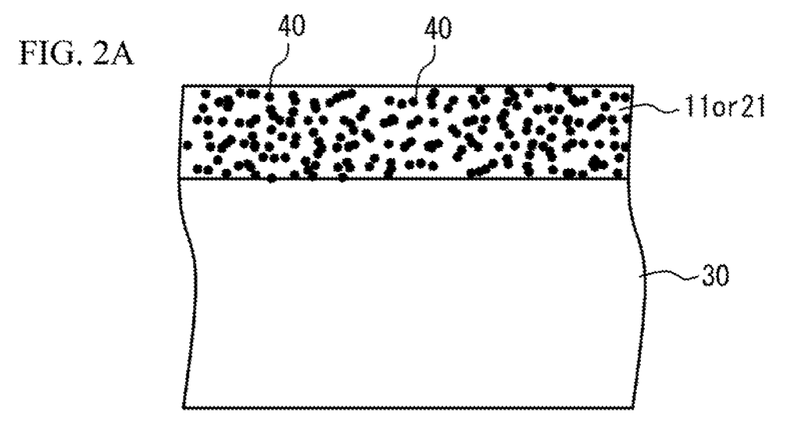
FIG. 2A to FIG. 2C illustrate a micro particle carbon and a board-shaped carbon.

In order to improve the performance of the all solid battery 100, it is preferable that the first electrode layer 11 and the second electrode layer 21 have preferable electron conductivity and preferable ionic conductivity. In order to achieve preferable electron conductivity of the first electrode layer 11 and the second electrode layer 21, it is preferable that the first electrode layer 11 and the second electrode layer 21 include a micro particle carbon 40 as a conductive auxiliary agent as illustrated in FIG. 2A. The micro particle carbon 40 is easily scattered into the first electrode layer 11 and the second electrode layer 21. Therefore, the micro particle carbon 40 is approximately evenly scattered in the first electrode layer 11 and the second electrode layer 21. Thus, the first electrode layer 11 and the second electrode layer 21 have preferable electron conductivity. However, when the micro particle carbon 40 is approximately evenly scattered, the micro particle carbon 40 has large influence on the sintering of the first electrode layer 11 and the second electrode layer 21 and degrades the sintering. For example, sufficient sintering is not achieved in the first electrode layer 11 and the second electrode layer 21. The sufficient sintering means that a density degree is 90% or more and porosity is 10 vol % or less. In this case, ionic conductivity may be reduced in the first electrode layer 11 and the second electrode layer 21. And so, it is thought that an amount of the micro particle carbon 40 is reduced. However, when the amount of the micro particle carbon 40 is reduced, sufficient electron conductivity may not be necessarily achieved.

Figure 2B:
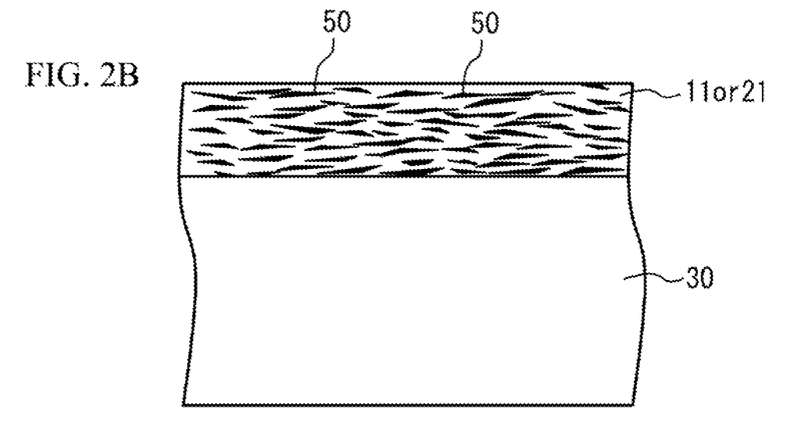

And so, as illustrated in FIG. 2B, a board-shaped carbon 50 may be added instead of the micro particle carbon 40. When the board-shaped carbon 50 is added, scattering of the carbon is suppressed in the first electrode layer 11 and the second electrode layer 21. Thus, the carbon unevenly (locally) exists. It is therefore possible to suppress degradation of sintering of the first electrode layer 11 and the second electrode layer 21. However, sufficiently electron conductivity may not be necessarily achieved, because the carbon unevenly (locally) exists.

Figure 2C:
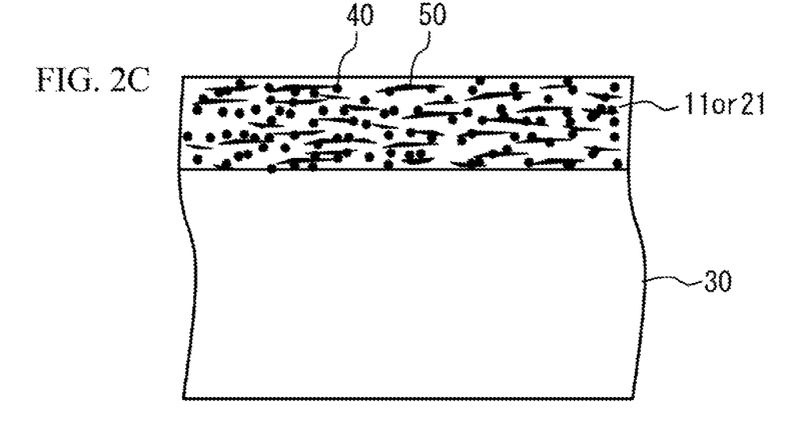

And so, in the embodiment, as illustrated in FIG. 2C, both the micro particle carbon 40 and the board-shaped carbon 50 are added to the first electrode layer 11 and the second electrode layer 21. In the structure, the first electrode layer 11 and the second electrode layer 21 have preferable electron conductivity and preferable ionic conductivity. Therefore, the performance of the all solid battery 100 is improved. The board-shaped carbon 50 is available with lower cost than a fiber-shaped carbon. It is therefore possible to suppress the cost.

When a ratio of the carbon is excessively high in the first electrode layer 11 and the second electrode layer 21, the capacity of the all solid battery 100 may be reduced. This is because a ratio of an active material in the first electrode layer 11 and the second electrode layer 21 is relatively reduced when the ratio of the carbon is excessively high. And so, it is preferable that the ratio of the carbon has an upper limit in the first electrode layer 11 and the second electrode layer 21. In the embodiment, in each of the first electrode layer 11 and the second electrode layer 21, it is preferable that a total amount of the micro particle carbon 40 and the board-shaped carbon 50 is less than 20 wt %. It is more preferable that the total amount is less than 15 wt %.

On the other hand, when the ratio of the carbon is excessively low in the first electrode layer 11 and the second electrode layer 21, sufficient electron conductivity may not be necessarily achieved. And so, it is preferable that the carbon ratio has a lower limit in the first electrode layer 11 and the second electrode layer 21. In the embodiment, in each of the first electrode layer 11 and the second electrode layer 21, it is preferable that the total amount of the micro particle carbon 40 and the board-shaped carbon 50 is more than 2 wt %. It is more preferable that the total amount is more than 5 wt %.

Next, when the ratio of the board-shaped carbon 50 with respect to the micro particle carbon 40 is excessively low, sufficient ionic conductivity may not be necessarily achieved in the first electrode layer 11 and the second electrode layer 21. On the other hand, when the ratio of the micro particle carbon 40 with respect to the board-shaped carbon 50 is excessively low, sufficient electron conductivity may not be necessarily achieved in the first electrode layer 11 and the second electrode layer 21. And so, it is preferable that the ratio between the micro particle carbon 40 and the board-shaped carbon 50 is regulated. In the embodiment, it is preferable that a weight ratio between the micro particle carbon 40 and the board-shaped carbon 50 is 1:9 to 9:1. It is more preferable that the ratio is 2:8 to 8:2.

The micro particle carbon can be defined as a carbon composed of particles of which a primary grain diameter is 0.5 μm or less. The board-shaped carbon can be defined as a carbon of which the longest size in an in-plane direction of a board is 5 μm or more, of which a ratio (aspect ratio) of the longest size with respect to a thickness is 5 or more, and of which a ratio (aspect ratio) of the smallest size in the in-plane direction of the board with respect to the thickness is 2 or more.

Figure 3:
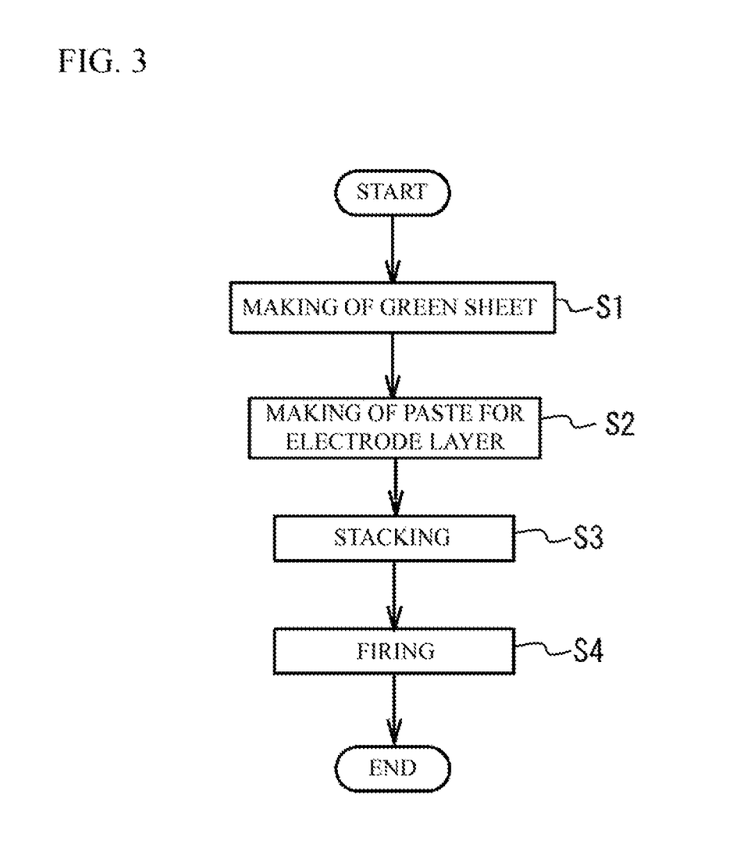
FIG. 3 illustrates a flowchart of a manufacturing method of an all solid battery.

Next, a description will be given of a manufacturing method of the all solid battery 100. FIG. 3 illustrates a flowchart of the manufacturing method of the all solid battery 100.

(Making process of green sheet) The powders of the oxide-based solid electrolyte structuring the solid electrolyte layer 30 is prepared so as to have appropriate particle size distribution. The resulting powders are evenly dispersed into aqueous solvent or organic solvent together with a binding agent, a dispersing agent, a plasticizer and so on. And slurry is obtained. In this case, a bead mill, a wet jet mill, a kneader, a high pressure homogenizer or the like may be used. It is preferable that the bead mill is used because adjusting of particle size distribution and dispersion are performed at the same time. The resulting slurry is coated. Thus, a green sheet having a desirable thickness is obtained. The coating method is not limited. For example, a slot die method, a reverse coat method, a gravure coat method, an over coat method, a doctor blade method or the like may be used.

(Making process of paste for electrode layer) A conductive auxiliary agent such as the micro particle carbon 40 and the board-shaped carbon 50, an active material, a solid electrolyte material, a binder, a plasticizer and so on are evenly dispersed into water or organic solvent. Thus, a paste for electrode layer is obtained. Pd, Ni, Cu, Fe or an alloy thereof may be used as the conductive auxiliary agent, in addition to the micro particle carbon 40 and the board-shaped carbon 50.

(Stacking process) The paste for electrode layer and the conductive metal paste for electric collector are printed on both faces of the green sheet. The printing method is not limited. For example, a screen printing method, an intaglio printing method, a letter press printing method, a calendar roll printing method or the like may be used. In order to make a stacked device having a thin layer and a large number of stacked layers, the screen printing is generally used. However, an ink jet printing may be preferable when a micro size electrode pattern or a special shape is necessary.

(Firing process) Next, the obtained multilayer structure is fired. The firing is performed in an oxidizing atmosphere or non-oxidizing atmosphere. A maximum temperature of the firing is 400 degrees C. to 1000 degrees C. It is preferable that the maximum temperature is 500 degrees C. to 900 degrees C. In order to sufficiently remove the binder before the maximum temperature, a temperature lower than the maximum temperature may be held in an oxidizing atmosphere. It is preferable that the multilayer structure is fired at a minimum temperature in an oxidizing atmosphere, in order to reduce the process cost. After firing, a re-oxidation process may be performed. In this manner, the all solid battery 100 is manufactured.

Figure 4A:
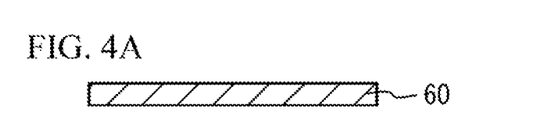
FIG. 4A to FIG. 4E illustrate schematic cross sections for describing a manufacturing method of a case where a plurality of cell units are stacked.
Figure 4B:
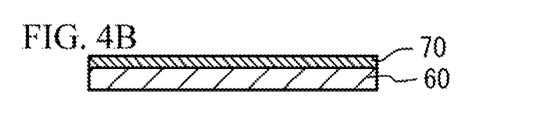
Figure 4C:
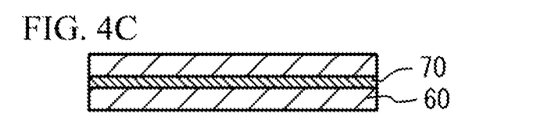
Figure 4D:
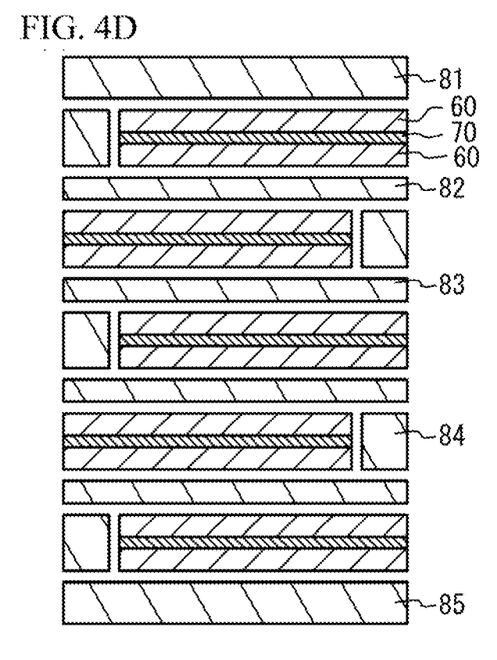
Figure 4E:
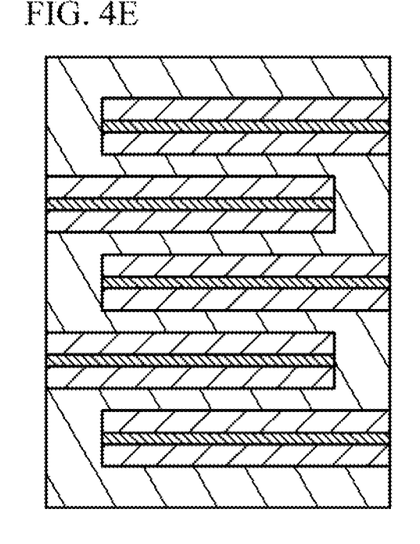

FIG. 4A to FIG. 4E illustrate schematic cross sections for describing a manufacturing method of a case where a plurality of cell units are stacked. As illustrated in FIG. 4A, a precursor 60 for an electrode layer is prepared with use of a paste for electrode layers. As illustrated in FIG. 4B, a conductive metal paste acting as a precursor 70 for an electric collector is printed on one face of the precursor 60. As illustrated in FIG. 4C, a multilayer structure in which the precursor 70 is sandwiched by two precursors 60 is prepared. Next, a plurality of the multilayer structures illustrated in FIG. 4C are prepared, and are stacked. As illustrated in FIG. 4D, precursors 81 to 85 for solid electrolyte layers are suitably arranged with use of the above-mentioned green sheets. After that, by compressing, a multilayer structure illustrated in FIG. 4E is formed. The resulting multilayer structure is cut if necessary and is fired in accordance with the firing process.

In the manufacturing method of the embodiment, both of the micro particle carbon 40 and the board-shaped carbon 50 are added to the paste for electrode layer. The micro particle carbon 40 is approximately evenly scattered in the first electrode layer 11 and the second electrode layer 21. Thus, the first electrode layer 11 and the second electrode layer 21 have preferable electron conductivity. When the board-shaped carbon 50 is added, preferable electron conductivity may be achieved even if an amount of the micro particle carbon 40 more than necessary is not added. Therefore, preferable sintering is achieved in the first electrode layer 11 and the second electrode layer 21. And, preferable ionic conductivity is achieved. Accordingly, the performance of the all solid battery 100 is improved.

EXAMPLES

The all solid batteries in accordance with the embodiment were made and the property was measured.

Examples 1 to 6 and Comparative Examples 1 to 3

Oxide-based solid electrolyte to be the solid electrolyte layer 30 is coated. The coated oxide-based solid electrolyte has a sheet shape and is used as a green sheet for solid electrolyte layer. Next, the micro particle carbon 40, the board-shaped carbon 50, an electrode active material (ceramics) and solid electrolyte (ceramics) are mixed by a ball mil with a predetermined mixing ratio. In any of examples 1 to 6 and the comparative examples 1 to 3, a weight ratio of the electrode active material and the solid electrolyte was 1:1. In the example 1, the weight ratio of the micro particle carbon 40, the board-shaped carbon 50 and the ceramics was 5:5:90. In the example 2, the weight ratio was 2:8:90. In the example 3, the weight ratio was 8:2:90. In the example 4, the weight ratio was 1:9:90. In the example 5, the weight ratio was 9:1:90. In the example 6, the weight ratio was 5:15:80. In the comparative example 1, the weight ratio was 0:10:90, and the micro particle carbon 40 was not used. In the comparative example 2, the weight ratio was 10:0:90, and the board-shaped carbon 50 was not used. In the comparative example 3, the weight ratio was 2:0:98, and the board-shaped carbon 50 was not used. The mixed materials were kneaded with solvent and binder into slurry. Thus, the paste for electrode layer was obtained. The paste for electrode layer was shaped into an electrode sheet. A plurality of green sheets were stacked. Thus, a solid electrolyte layer is formed. The electrode sheet was bonded to an upper face and a lower face of the solid electrolyte layer. The resulting solid electrolyte layer was stamped into a disc shape and was used as a sample after firing.

An Au electrode was formed on both faces of the sintered structure by a sputtering method. Impedance of the sintered structure was measured by an AC impedance method at 25 degrees C. Impedance $|z1|$ at 0.1 Hz was measured. Thus, electron conductivity in the electrode layer was measured. When $|z1|$ was less than 40, the sample was determined as good (triangle). When $|z1|$ was less than 30, the sample was determined as very good (circle). When $|z1|$ was less than 20, the sample was determined as especially good (double circle). When $|z1|$ was 40 or more, the sample was determined as bad (cross). In addition, impedance $|z2|$ at 1 kHz was measured. Thus, ionic conductivity of the electrode layer was measured. When $|z2|$ was less than 0.70, the sample was determined as good (triangle). When $|z2|$ was less than 0.50, the sample was determined as very good (circle). When $|z2|$ was less than 0.20, the sample was determined as especially good (double circle). When $|z2|$ was 0.70 or more, the sample was determined as bad (cross). The sample determined as very good (circle) in the both impedance measurement was determined as totally very good (circle). The sample not determined as bad (cross) but including good (triangle) was determined as totally good (triangle). The sample determined as bad in anyone of the impedance measurements was determined as totally bad (cross). A charge/discharge test was performed in a room temperature. Each sample was charged to 2.7 V with a current density of 10 μA/cm$^2$. After that, each sample was left as it was for ten minutes. And each sample was discharged to 0 V with the same current density. A discharge capacity was treated as a cell capacity.

Table 1 and Table 2 show measured results. As shown in Table 1 and Table 2, the examples 1 to 6 were determined as totally good. It is thought that this was because the electrode layer included the micro particle carbon 40 and the board-shaped carbon 50. In the comparative example 1, the electron conductivity was determined as bad. It is thought that this was because the micro particle carbon 40 was not added. In the comparative examples 2 and 3, the ionic conductivity was determined as bad. It is thought that this was because the board-shaped carbon 50 was not added.

TABLE 1

|  | MICRO PARTICLE | BOARD-SHAPED | CERAMICS | $|z1|$ (kΩ) | $|z2|$ (kΩ) |
|---|---|---|---|---|---|
| EXAMPLE 1 | 5 | 5 | 90 | 24.1 | 0.39 |
| EXAMPLE 2 | 2 | 8 | 90 | 29.7 | 0.27 |
| EXAMPLE 3 | 8 | 2 | 90 | 19.8 | 0.40 |
| EXAMPLE 4 | 1 | 9 | 90 | 38.5 | 0.20 |
| EXAMPLE 5 | 9 | 1 | 90 | 15.0 | 0.55 |
| EXAMPLE 6 | 5 | 15 | 80 | 22.1 | 0.57 |
| COMPARATIVE EXAMPLE 1 | 0 | 10 | 90 | 45.8 | 0.18 |
| COMPARATIVE EXAMPLE 2 | 10 | 0 | 90 | 15.3 | 0.71 |
| COMPARATIVE EXAMPLE 3 | 2 | 0 | 98 | 43.0 | 0.17 |

TABLE 2

|  | ELECTRON CONDUCTIVITY | IONIC CONDUCTIVITY | TOTAL | DISCHARGE CAPACITY μAh/cm$^2$ |
|---|---|---|---|---|
| EXAMPLE 1 | ○ | ○ | ○ | 47 |
| EXAMPLE 2 | ○ | ○ | ○ | 43 |
| EXAMPLE 3 | ◎ | ○ | ○ | 54 |
| EXAMPLE 4 | Δ | ◎ | Δ | 38 |
| EXAMPLE 5 | ◎ | Δ | Δ | 53 |
| EXAMPLE 6 | ○ | Δ | Δ | 31 |
| COMPARATIVE EXAMPLE 1 | X | ◎ | X | 11 |
| COMPARATIVE EXAMPLE 2 | ◎ | X | X | 44 |
| COMPARATIVE EXAMPLE 3 | X | ◎ | X | 10 |

In comparison to the examples 4 and 5, both the electron conductivity and the ionic conductivity were preferable in the examples 1 to 3. It is thought that this was because the weight ratio between the micro particle carbon 40 and the board-shaped carbon 50 was 2:8 to 8:2. In comparison to the example 6, a preferable capacity was achieved in the examples 1 to 5. It is thought that this was because the total amount of the micro particle carbon 40 and the board-shaped carbon 50 was less than 20 wt % in the electrode layers.

Although the embodiments of the present invention have been described in detail, it is to be understood that the various change, substitutions, and alterations could be made hereto without departing from the spirit and scope of the invention.

What is claimed is:

1. An all solid battery comprising:
    a solid electrolyte layer including an oxide-based electrolyte;
    a first electrode layer that is a sintered layer formed on a first face of the solid electrolyte layer and includes a ceramic grain; and
    a second electrode layer that is a sintered layer formed on a second face of the solid electrolyte layer and includes a ceramic grain,
    wherein at least one of the first electrode layer and the second electrode layer includes a grain-shaped carbon and a board-shaped carbon which is not a fiber-shaped carbon,
    wherein:
    the grain-shaped carbon is a grain of which a primary particle diameter is 0.5 µm or less,
    in the board-shaped carbon, a longest size in a plane direction thereof is 5 µm or more,
    in the board-shaped carbon, an aspect ratio of the longest size with respect to a thickness is 5 or more, and
    in the board-shaped carbon, an aspect ratio of a smallest size in the plane direction with respect to the thickness is 2 or more.

2. The all solid battery as claimed in claim 1, wherein a weight ratio between the grain-shaped carbon and the board-shaped carbon is 1:9 to 9:1 in each of the first electrode layer and the second electrode layer.

3. The all solid battery as claimed in claim 1, wherein a total weight of the grain-shaped carbon and the board-shaped carbon is less than 20 wt % in each of the first electrode layer and the second electrode layer.

4. The all solid battery as claimed in claim 1, wherein the oxide-based solid electrolyte has a NASICON structure.

5. A manufacturing method of an all solid battery comprising:
    a first step of arranging a paste for an electrode layer on both faces of a green sheet including a particle of an oxide-based solid electrolyte, the paste including a grain-shaped carbon, a board-shaped carbon which is not a fiber-shaped carbon, and a ceramic particle; and
    a second step of firing a structure formed in the first step,
    wherein:
    the grain-shaped carbon is a grain of which a primary particle diameter is 0.5 µm or less,
    in the board-shaped carbon, a longest size in a plane direction thereof is 5 µm or more,
    in the board-shaped carbon, an aspect ratio of the longest size with respect to a thickness is 5 or more, and
    in the board-shaped carbon, an aspect ratio of a smallest size in the plane direction with respect to the thickness is 2 or more.

6. The all solid battery as claimed in claim 1, wherein:
    the first electrode has a positive electrode active material having olivine type crystal structure and including the grain-shaped carbon and the board-shaped carbon, and
    the second electrode has a negative electrode active material having a negative electrode active material and including the grain-shaped carbon and the board-shaped carbon.

* * * * *